United States Patent
Fang et al.

(10) Patent No.: US 9,906,273 B2
(45) Date of Patent: Feb. 27, 2018

(54) PROXIMITY DETECTION METHOD AND APPARATUS FOR NEAR FIELD COMMUNICATION

(71) Applicant: Shenzhen Goodix Technology Co., Ltd., Shenzhen (CN)

(72) Inventors: Jun Fang, Shenzhen (CN); Siqiu Cheng, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 31 days.

(21) Appl. No.: 15/194,603

(22) Filed: Jun. 28, 2016

(65) Prior Publication Data

US 2016/0308585 A1  Oct. 20, 2016

Related U.S. Application Data

(63) Continuation of application No. PCT/CN2014/076292, filed on Apr. 25, 2014.

(30) Foreign Application Priority Data

Dec. 31, 2013 (CN) .......................... 2013 1 0752462

(51) Int. Cl.
*H04B 7/00* (2006.01)
*H04B 5/00* (2006.01)
(Continued)

(52) U.S. Cl.
CPC ....... *H04B 5/0031* (2013.01); *G06K 7/10009* (2013.01); *H04L 5/0055* (2013.01);
(Continued)

(58) Field of Classification Search
CPC ..... H04B 5/0031; H04L 43/16; H04L 5/0055; H04M 1/2477
(Continued)

(56) References Cited

U.S. PATENT DOCUMENTS

| 4,879,755 A | 11/1989 | Stolarczyk et al. |
| 2009/0041169 A1* | 2/2009 | Fujita .................. H04B 1/7183 375/354 |

(Continued)

FOREIGN PATENT DOCUMENTS

| CN | 1034835 | 8/1989 |
| CN | 103259569 A | 8/2013 |

(Continued)

OTHER PUBLICATIONS

Extended European Search Report for corresponding EP Application No. 14876195.0, Applicant: Shenzhen Huiding Technology Co., Ltd., dated Aug. 7, 2017, 11 pages.

(Continued)

*Primary Examiner* — Eugene Yun

(57) ABSTRACT

The present disclosure discloses a proximity detection method and apparatus for a near field communication, which belongs to the field of communications technologies. The method includes: sending, by a first electronic device, a signal of a detection frame; determining whether a second electronic device capable of performing the near field communication exists according to a received response frame, wherein the detection frame includes at least two symbols modulated with different frequencies. In embodiments of the present disclosure, a signal of a detection frame which includes multiple symbols modulated with different frequencies is sent, so that a peer-to-peer electronic device existing within a communicatable range can be detected for communication in a case of that these modulation frequencies suffer an interference.

15 Claims, 7 Drawing Sheets

(51) Int. Cl.
H04L 5/00 (2006.01)
H04L 12/26 (2006.01)
H04M 1/247 (2006.01)
G06K 7/10 (2006.01)
H04W 4/00 (2018.01)
H04W 8/00 (2009.01)
H04W 48/14 (2009.01)

(52) U.S. Cl.
CPC .......... H04L 43/16 (2013.01); H04M 1/2477 (2013.01); H04W 4/008 (2013.01); H04W 8/005 (2013.01); H04W 48/14 (2013.01)

(58) Field of Classification Search
USPC ................................................ 455/41.1, 41.2
See application file for complete search history.

(56) References Cited

U.S. PATENT DOCUMENTS

| | | |
|---|---|---|
| 2013/0070750 A1 | 3/2013 | Kim et al. |
| 2013/0230040 A1 | 9/2013 | Adachi et al. |
| 2014/0340325 A1 | 11/2014 | Fang et al. |
| 2016/0070385 A1 | 3/2016 | Fang et al. |
| 2016/0320910 A1 | 11/2016 | Fang et al. |

FOREIGN PATENT DOCUMENTS

| | | |
|---|---|---|
| CN | 103338061 A | 10/2013 |
| CN | 103440075 A | 12/2013 |
| CN | 103701545 A | 4/2014 |
| EP | 1575183 A1 | 9/2005 |
| JP | 2013-183281 A | 9/2013 |

OTHER PUBLICATIONS

Search Report for CN Application No. 201310752462.4, Applicant: Shenzhen Huiding Technology Co., Ltd., dated Apr. 28, 2015, 2 pages.

International Search Report for International Application No. PCT/CN2014/076292, Applicant: Shenzhen Huiding Technology Co., Ltd., dated Oct. 16, 2014, 2 pages.

* cited by examiner

PROXIMITY DETECTION METHOD AND APPARATUS FOR NEAR FIELD COMMUNICATION

CROSS-REFERENCE TO RELATED APPLICATIONS

This application is a continuation of International Application No. PCT/CN2014/076292, filed on Apr. 25, 2014, which claims priority to Chinese Patent Application No. 201310752462.4, filed on Dec. 31, 2013, both of which are hereby incorporated by reference in their entireties.

TECHNICAL FIELD

The present disclosure relates to the field of near field communications technologies, and in particular, to a proximity detection method and apparatus for a near field communication.

BACKGROUND

Performing a near field communication (NFC) by using an electric field enables a non-contact peer-to-peer data transmission to be performed between electronic devices within a range of about ten centimeters. Due to a low transmission power, a short communication distance and a high security, the NFC has been widely used in industries such as logistics, payment, finance and warehouse management and the like. With rise of wireless internet and widespread use of smart phones, functions such as mobile payment, information sharing and the like become more widely used.

However, when a communication between two electronic devices of a near field communication is not established, a detectable signal is weak and vulnerable to suffer an electromagnetic interference from a communication environment, so that quality of the communication can not be ensured. For example, in an application scenario of a touch screen, when a communication between two devices is not established, a communication signal between two touch screens is very weak, and a capacitive screen is generally quite close to an LCD, a drive signal of the LCD will interfere with a communication signal between capacitive screens, so a communication can substantially not be implemented if suffering an interference in a case of that a display screen is open. Therefore, it is a technical problem to be solved to detect whether a communicatable peer-to-peer electronic device exists within a communicatable range in a case of a weak signal or greater interference, so that the electronic device identifies whether a near field communication needs to be performed.

SUMMARY

In view of this, a technical problem may be solved in the present disclosure is to provide a proximity detection method and apparatus for a near field communication, so as to detect whether a communicatable electronic device exists within a communicatable range in a case of a weak signal or great interference.

Technical solutions employed in the present disclosure for solving the above-mentioned technical problem are as follows:

According to one aspect of the present disclosure, a proximity detection method for a near field communication is provided, which is applied to a first electronic device for the near field communication, and the method includes:

sending, by the first electronic device, a signal of a detection frame, where the detection frame includes at least two symbols modulated with different frequencies;

determining whether a second electronic device capable of performing the near field communication exists according to a received response frame.

Preferably, the detection frame includes a first detection frame A1 and a second detection frame A2, and the sending, by the first electronic device, the signal of the detection frame further includes:

sending, by the first electronic device, the first detection frame A1 or the second detection frame A2;

when a signal of the response frame replied by the second electronic device is received, switching the detection frame to be sent from the first detection frame A1 to the second detection frame A2 or from the second detection frame A2 to the first detection frame A1.

Preferably, the response frame includes a first response frame B1 and a second response frame B2, and the determining whether the second electronic device capable of performing the near field communication exists according to the received response frame further includes:

increasing a first response time M1 by 1 after receiving the response frame replied by the second electronic device;

if the response frame is the second response frame B2, increasing a second response time M2 by 1, further determining whether M2 meets a second threshold C2, and if yes, determining that the second electronic device is located within a near field communicatable range.

According to another aspect of the present disclosure, a proximity detection method for a near field communication is provided, which is applied to a second electronic device for the near field communication, and the method includes:

receiving a signal of a detection frame sent by a first electronic device;

replying a response frame to the first electronic device, where the response frame includes at least two symbols modulated with different frequencies; and determining whether the first electronic device is within a near field communicatable range according to the received detection frame.

Preferably, the replying the response frame to the first electronic device further includes:

determining whether the signal of the detection frame is a first detection frame A1 or a second detection frame A2 after receiving the signal of the detection frame, and if the detection frame is the first detection frame A1 and a first acknowledgement time N1 is an even number, increasing the first acknowledgement time N1 by 1, otherwise remaining the same; if the detection frame is the second detection frame A2 and the first acknowledgement time N1 is an odd number, increasing the first acknowledgement time N1 by 1, otherwise remaining the same;

determining whether the first acknowledgement time N1 exceeds a first threshold C1, and if the first acknowledgement time N1 exceeds the first threshold C1, sending a second response frame B2 to the first electronic device, otherwise, sending a first response frame B1 to the first electronic device.

Preferably, the determining whether the first electronic device is within the near field communicatable range according to the received detection frame further includes:

when the first acknowledgement time N1 exceeds the first threshold C1, if the signal of the detection frame is received, determining whether the signal of the detection frame is the first detection frame A1 or the second detection frame A2, and if the detection frame is the first detection frame A1 and a second acknowledgement time N2 is an even number, increasing the second acknowledgement time N2 by 1, otherwise remaining the same; if the detection frame is the second detection frame A2 and the second acknowledgement time N2 is an odd number, increasing the second acknowledgement time N2 by 1, otherwise remaining the same; determining whether the second acknowledgement time N2 meets a second threshold C2, and if yes, determining that the first electronic device is located within the near field communicatable range.

According to yet another aspect of the present disclosure, a proximity detection method for a near field communication is provided, which is applied to a first electronic device and a second electronic device for the near field communication, and the method includes:

sending, by the first electronic device, a signal of a detection frame;

replying, by the second electronic device, a response frame to the first electronic device, and determining whether the first electronic device is within a near field communicatable range according to a received detection frame; and determining, by the first electronic device, whether the second electronic device is within the near field communicatable range according to a received response frame, where both the detection frame and the response frame include at least two symbols modulated with different frequencies.

According to yet another aspect of the present disclosure, a proximity detection apparatus for a near field communication is provided, which is applied to a first electronic device for the near field communication, and the apparatus includes:

a first sending unit, configured to send a signal of a detection frame, where the detection frame includes at least two symbols modulated with different frequencies;

a first receiving unit, configured to receive a signal of a response frame replied by a second electronic device;

a first analysis unit, configured to analyze the response frame replied by the second electronic device; and a first determining unit, configured to determine whether the second electronic device is within a near field communicatable range according to the received response frame.

Preferably, the first sending unit is specifically configured to: send a first detection frame A1 or a second detection frame A2; when the signal of the response frame replied by the second electronic device is received, switch the detection frame to be sent from the first detection frame A1 to the second detection frame A2 or from the second detection frame A2 to the first detection frame A1.

Preferably, the first determining unit is specifically configured to: when the received response frame replied by the second electronic device is a second response frame B2, increase a second response time M2 by 1, further determine whether M2 meets a second threshold C2, and if yes, determine that the second electronic device is located within the near field communicatable range.

According to yet another aspect of the present disclosure, a proximity detection apparatus for a near field communication is provided, which is applied to a second electronic device for the near field communication, and the apparatus includes:

a second receiving unit, configured to receive a signal of a detection frame sent by a first electronic device;

a second analysis unit, configured to analyze the signal of the detection frame received by the second receiving unit;

a second sending unit, configured to send a response frame to the first electronic device, where the response frame includes at least two symbols modulated with different frequencies; and a second determining unit, configured to determine whether the first electronic device is within a near field communicatable range according to the received detection frame.

Preferably, the second sending unit is specifically configured to: determine whether the signal of the detection frame is a first detection frame A1 or a second detection frame A2 after receiving the signal of the detection frame, and if the detection frame is the first detection frame A1 and a first acknowledgement time N1 is an even number, increase the first acknowledgement time N1 by 1, otherwise remain the same; if the detection frame is the second detection frame A2 and the first acknowledgement time N1 is an odd number, increase the first acknowledgement time N1 by 1, otherwise remain the same; determine whether the first acknowledgement time N1 exceeds a first threshold C1, and if the first acknowledgement time N1 exceeds the first threshold C1, send a second response frame B2 to the first electronic device, otherwise, send a first response frame B1 to the first electronic device.

Preferably, the second determining unit is specifically configured to: when the first acknowledgement time N1 exceeds the first threshold C1, if the signal of the detection frame is received, determine whether the signal of the detection frame is the first detection frame A1 or the second detection frame A2, and if the detection frame is the first detection frame A1 and a second acknowledgement time N2 is an even number, increase the second acknowledgement time N2 by 1, otherwise remain the same; if the detection frame is the second detection frame A2 and the second acknowledgement time N2 is an odd number, increase the second acknowledgement time N2 by 1, otherwise remain the same; determine whether the second acknowledgement time N2 meets a second threshold C2, and if yes, determine that the first electronic device is located within the near field communicatable range.

DETAILED DESCRIPTION

In order to make technical problems to be solved, technical solutions and beneficial effects of the present disclosure clearer, a further detailed description of the present disclosure will be given below in combination with accompanying drawings and embodiments. It should be understood that, specific embodiments described herein are merely used for interpreting the present disclosure, rather than limiting the present disclosure.

A first electronic device means one party which initiates a communication actively, and a second electronic device means the other party of the communication. For convenience of description, the first electronic device is called Master and the second electronic device is called Slave hereinafter.

Embodiment 1

Figure 1:
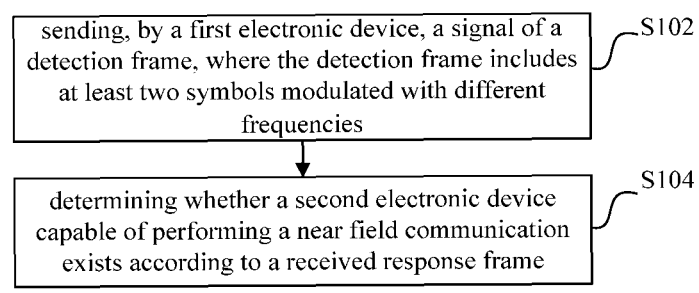
FIG. 1 is a flowchart of a proximity detection method applied to a first electronic device according to an embodiment of the present disclosure.

As shown in FIG. 1, it is a flowchart of a proximity detection method provided in an embodiment of the present disclosure, and the method is applied to a Master and specifically includes the following steps.

S102, sending, by a first electronic device, a signal of a detection frame.

Figure 2:
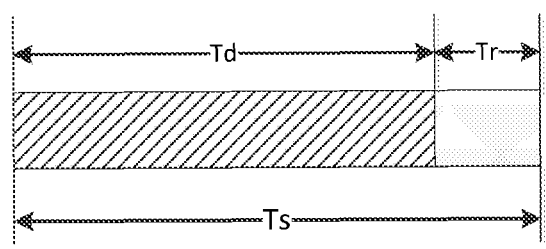
FIG. 2 is a schematic structural diagram of a symbol of the present disclosure.

The detection frame includes at least two symbols modulated with different frequencies. A symbol is a minimum communication unit that carries bit data. A modulation mode of the symbol employs a mode similar to FSK (frequency shift keying), which may be used for carrying pilot and data information, and a plurality of symbols form a frame. Referring to FIG. 2, Ts=200 microseconds, Td=0.8 Ts=160 microseconds, Tr=0.2 Ts=40 microseconds, within a time interval Td, a touch screen sends a signal modulated with FSK, and within the time Tr, the touch screen does not send any signal. It generally needs some time that a driver circuit of the touch screen switches between different frequencies, so that a piece of blank time is needed, and Tr may also be taken as a reserve time for switching from sending to receiving.

As a preferred solution, the step 102 may further include: sending, by the first electronic device, a first detection frame A1 or a second detection frame A2; when a signal of a response frame replied by a Slave is received, switching the detection frame to be sent from the first detection frame A1 to the second detection frame A2 or from the second detection frame A2 to the first detection frame A1.

S104, determining whether a Slave capable of performing a near field communication exists according to a received response frame.

As a preferred example, the step 104 may further include: increasing a first response time M1 by 1 after receiving the response frame replied by the Slave; if the response frame is a second response frame B2, increasing a second response time M2 by 1, further determining whether M2 meets a second threshold C2, and if yes, determining that the Slave is located within a near field communicatable range.

In order to further improve stability of a communication, the method also includes: if the response frame replied by the Slave is not received again when a preset time is out, decreasing the first response time M1 or the second response time M2 by 1 time or 2 times.

According to the embodiment of the present disclosure, in a case of that a signal is weak or an external interference exists, another communicatable electronic device within the communicatable range may be detected. A detection result may be taken as a condition of triggering a communication to enable an electronic device to identify whether the communication is needed. Meanwhile, it may also inform respective main control chip to close an LCD, so that the interference can be minimized, thereby improving quality of the communication.

Embodiment 2

Figure 3:
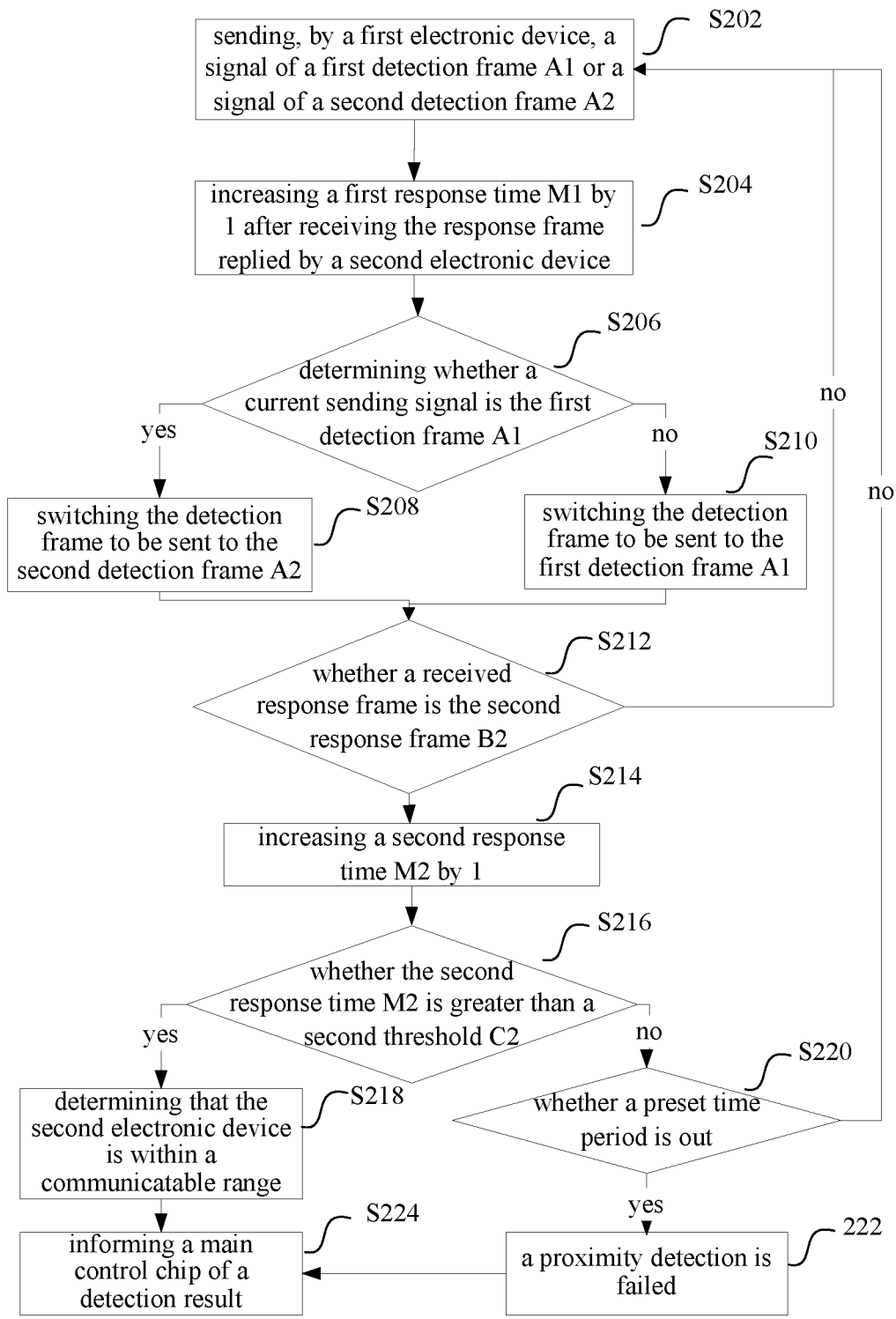
FIG. 3 is a flowchart of a proximity detection method applied to a first electronic device according to a preferred embodiment of the present disclosure.

FIG. 3 is a flowchart of a proximity detection method provided in a preferred embodiment of the present disclosure, and the method includes:

S202, sending, by a Master, a signal of a first detection frame A1 or a signal of a second detection frame A2.

Figure 4:
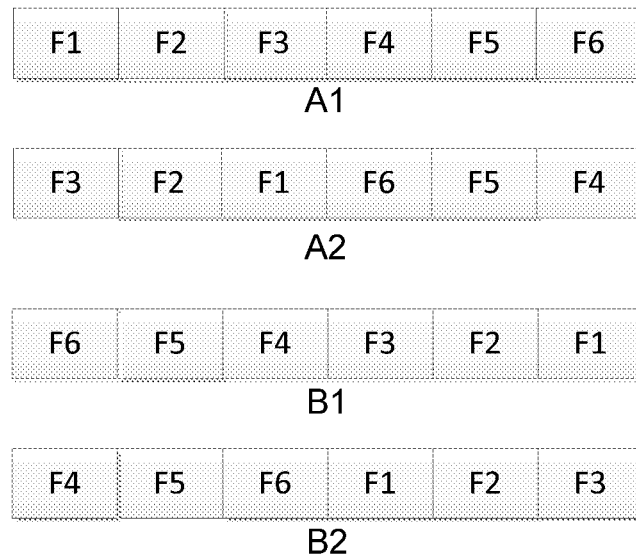
FIG. 4 is a schematic structural diagram of a detection frame and a response frame thereof according to a preferred embodiment of the present disclosure.
Figure 5:
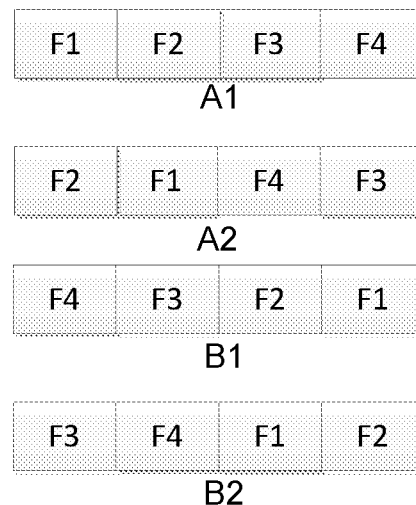
FIG. 5 is a schematic structural diagram of another detection frame and a response frame thereof according to a preferred embodiment of the present disclosure.

Specifically, the Master uses two different frames when performing a proximity detection, for example, as shown in FIG. 4, a first detection frame A1 is: [F1, F2, F3, F4, F5, F6]; a second detection frame A2 is: [F3, F2, F1, F6, F5, F4], where F1 to F6 represent signals modulated with different frequencies. Generally, F1 to F6 are 450 KHz, 400 KHz, 350 KHz, 300 KHz, 250 KHz and 200 KHz, respectively. Certainly, it may also use other frequency combinations. As shown in FIG. 5, a first detection frame A1 can be: [F1, F2, F3, F4] and a second detection frame A2 can be: [F2, F1, F4, F3]. Optionally, F1 to F6 are six neighbor frequencies in a frequency set {525 KHz, 487.5 KHz, 412.5 KHz, 375 KHz, 337.5 KHz, 262.5 KHz, 225 KHz, 187.5 KHz}.

S204, increasing a first response time M1 by 1 after receiving a response frame replied by a Slave.

Specifically, the Slave also uses two different frames when performing the proximity detection, as shown in FIG. 4, a first response frame B1 is: [F6, F5, F4, F3, F2, F1]; a second response frame B2 is: [F4, F5, F6, F1, F2, F3]; where F1 to F6 represent symbols modulated with different frequencies. F1 to F6 correspond to detection frames, and they are generally 450 KHz, 400 KHz, 350 KHz, 300 KHz, 250 KHz and 200 KHz respectively. Certainly, it may use other frequency combinations corresponding to detection frequencies. As shown in FIG. 5, a first response frame B1 is: [F4, F3, F2, F1]; and a second response frame B2 is: [F3, F4, F2, F1].

S206, determining whether a first sending signal is the first detection frame A1, if yes, performing step S208, and otherwise performing step S210.

S208, switching a detection frame to be sent to the second detection frame A2.

S210, switching a detection frame to be sent to the first detection frame A1.

Specifically, steps S206 to S210 are to make the Master send two detection frames alternately after an acknowledgement is received each time. For example, it may send the first detection frame A1 constantly before acknowledging that an odd number of times of response of the Slave is received, and send the second detection frame A2 after receiving a reply of the Slave; send the second detection frame A2 constantly before acknowledging that an even number of times of response is received, and send the first detection frame A1 after receiving a reply of the Slave; and it sends a signal of a detection frame constantly in this manner before acknowledging that a proximity detection is successful or unsuccessful; i.e., a reversal will occur on a type of a proximity detection frame to be sent after the Master receives a detection reply of the Slave.

S212, determining whether a received response frame is the second response frame B2, and if yes, performing step S214, otherwise returning to step S202.

S214, increasing a second response time M2 by 1.

S216, determining whether the second response time M2 is greater than a second threshold C2, and if yes, performing step S218, otherwise performing step S220.

S218, determining that the Slave is within a communicatable range.

S220, determining whether a preset time period is out, if yes, performing step S222, otherwise returning to step S202;

S222, informing a main control chip of a detection result.

Figure 6:
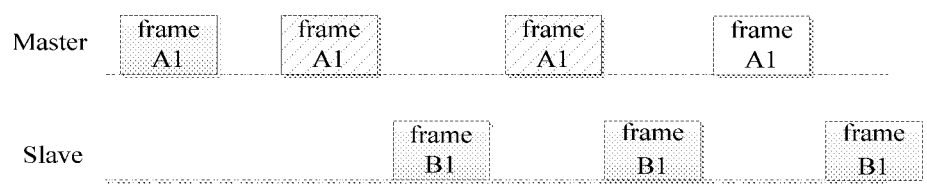
FIG. 6 is a schematic diagram of first 8 interactions in a proximity detection method according to a preferred embodiment of the present disclosure.
Figure 7:
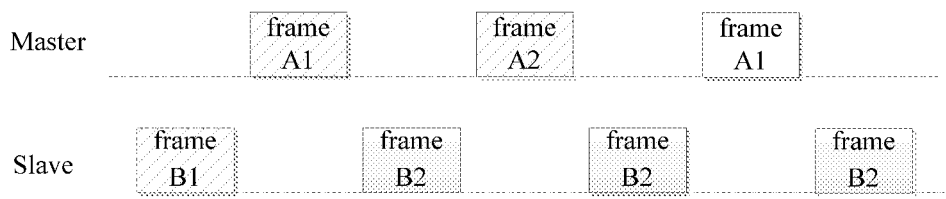
FIG. 7 is a schematic diagram of latter 4 interactions in a proximity detection method according to a preferred embodiment of the present disclosure.

For example, when an acknowledgement manner of 8+4 is employed, i.e., a first threshold C1 is 8 and a second threshold C2 is 4. As shown in FIG. 6, no matter receiving the first detection frame A1 or the second detection frame A2, the Slave replies the first response frame B1 after receiving a signal of a detection frame in first 8 times, when it replies the first response frame B1 8 times, as shown in FIG. 7, if a detection signal is detected again, it replies a second response frame B2; after replying the second response frame B2 4 times, the Slave itself believes that a proximity detection is successful; subsequently, the Master/Slave continues to keep its respective state for at least 150 ms; then it may enter a data receiving mode, if no data is received within a certain time period after entering the data receiving mode, it believes that a connection is failed, and a timeout is defined by an upper layer protocol. After receiving the second response frame B2 4 times continuously, the Master believes that the proximity detection is successful and shifts into a data sending mode after keeping a current state for 150 ms.

According to the embodiment of the present disclosure, in a case of that an external interference exists (e.g., a case of that an LCD is open), another communicatable electronic device within a communicatable range may be detected.

Embodiment 3

Figure 8:
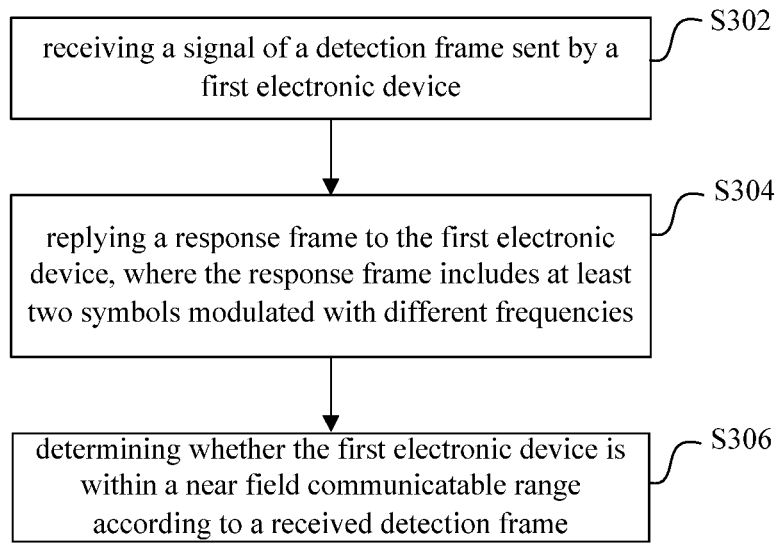
FIG. 8 is a flowchart of a proximity detection method applied to a second electronic device according to an embodiment of the present disclosure.

As shown in FIG. 8, it is a proximity detection method applied to a Slave provided in the present disclosure, and the method includes:

S302, receiving a signal of a detection frame sent by a Master.

The detection frame includes a first detection frame A1 and a second detection frame A2. For example, as shown in FIG. 4, the first detection frame A1 is: [F1, F2, F3, F4, F5, F6]; the second detection frame A2 is: [F3, F2, F1, F6, F5, F4]; or as shown in FIG. 4, the first detection frame A1 is: [F1, F2, F3, F4]; the second detection frame A2 is: [F2, F1, F4, F3]. F1, F2, F3, F4, F5, F6 are symbols modulated with different frequencies respectively. For example, the F1, F2, F3, F4, F5, F6 are symbols modulated with 450 KHz, 400 KHz, 350 KHz, 300 KHz, 250 KHz and 200 KHz, respectively. Optionally, F1 to F6 are six neighbor frequencies in a frequency set {525 KHz, 487.5 KHz, 450 KHz, 412.5 KHz, 375 KHz, 337.5 KHz, 300 KHz, 262.5 KHz, 225 KHz, 187.5 KHz, 150 KHz}. Optionally, F1 to F6 are 487.5 KHz, 412.5 KHz, 375 KHz, 337.5 KHz, 262.5 KHz and 225 KHz.

S304, replying a response frame to the Master.

The response frame includes at least two symbols modulated with different frequencies, and a symbol means a minimum communication unit that carries bit data.

The response frame also includes a first response frame B1 and a second response frame B2, which correspond to detection frames. As shown in FIG. 4, the first response frame B1 is: [F6, F5, F4, F3, F2, F1]; the second response frame B2 is: [F4, F5, F6, F1, F2, F3]; or as shown in FIG. 5, the first response frame B1 is: [F4, F3, F2, F1]; the second response frame B2 is: [F3, F4, F2, F1]; where the F1, F2, F3, F4, F5, F6 are symbols modulated with different frequencies respectively. For example, the F1, F2, F3, F4, F5, F6 are symbols modulated with 450 KHz, 400 KHz, 350 KHz, 300 KHz, 250 KHz and 200 KHz, respectively. Optionally, F1 to F6 are six neighbor frequencies in a frequency set {525 KHz, 487.5 KHz, 450 KHz, 412.5 KHz, 375 KHz, 337.5 KHz, 300 KHz, 262.5 KHz, 225 KHz, 187.5 KHz, 150 KHz}. Optionally, F1 to F6 are 487.5 KHz, 412.5 KHz, 375 KHz, 337.5 KHz, 262.5 KHz and 225 KHz.

As a preferred solution of the step, the step further includes: determining whether the signal of the detection frame is a first detection frame A1 or a second detection frame A2 after receiving the signal of the detection frame, and if the detection frame is the first detection frame A1 and a first acknowledgement time N1 is an even number, increasing the first acknowledgement time N1 by 1, otherwise remaining the same; if the detection frame is the second detection frame A2 and the first acknowledgement time N1 is an odd number, increasing the first acknowledgement time N1 by 1, otherwise remaining the same; determining whether the first acknowledgement time N1 exceeds a first threshold C1, and if the first acknowledgement time N1 exceeds the first threshold C1, sending the second response frame B2 to the first electronic device, otherwise, sending the first response frame B1 to the first electronic device.

In order to further improve stability of a communication, the method also includes: if the response frame replied by the Slave is not received again when a preset time is out, decreasing the first acknowledgement time N1 or the second acknowledgement time N2 by 1 time or 2 times.

For example, when an acknowledgement manner of 8+4 is employed, i.e., a first threshold C1 is 8 and a second threshold C2 is 4. As shown in FIG. 6, no matter receiving the first detection frame A1 or the second detection frame A2, the Slave replies the first response frame B1 after receiving a signal of a detection frame in first 8 times, when it replies the first response frame B1 8 times, as shown in FIG. 7, if a detection signal is detected again, it replies a second response frame B2; after replying the second response frame B2 4 times, the Slave itself believes that a proximity detection is successful; subsequently, the Master/Slave continues to keep its respective state for at least 150 ms; then it may enter a data receiving mode, if no data is received within a certain time period after entering the data receiving mode, it believes that a connection is failed, and a timeout is defined by an upper layer protocol.

S306, determining whether the Master is within a near field communicatable range according to a number of times of receiving the detection frame.

As a preferred solution of the step, the step further includes: when the first acknowledgement time N1 exceeds the first threshold C1, if the signal of the detection frame is received, determining whether the signal of the detection frame is the first detection frame A1 or the second detection frame A2, and if the detection frame is the first detection frame A1 and a second acknowledgement time N2 is an even number, increasing the second acknowledgement time N2 by 1, otherwise remaining the same; if the detection frame is the second detection frame A2 and the second acknowledgement time N2 is an odd number, increasing the second acknowledgement time N2 by 1, otherwise remaining the same; determining whether the second acknowledgement time N2 meets a second threshold C2, and if yes, determining that the first electronic device is located within the near field communicatable range.

Figure 9:
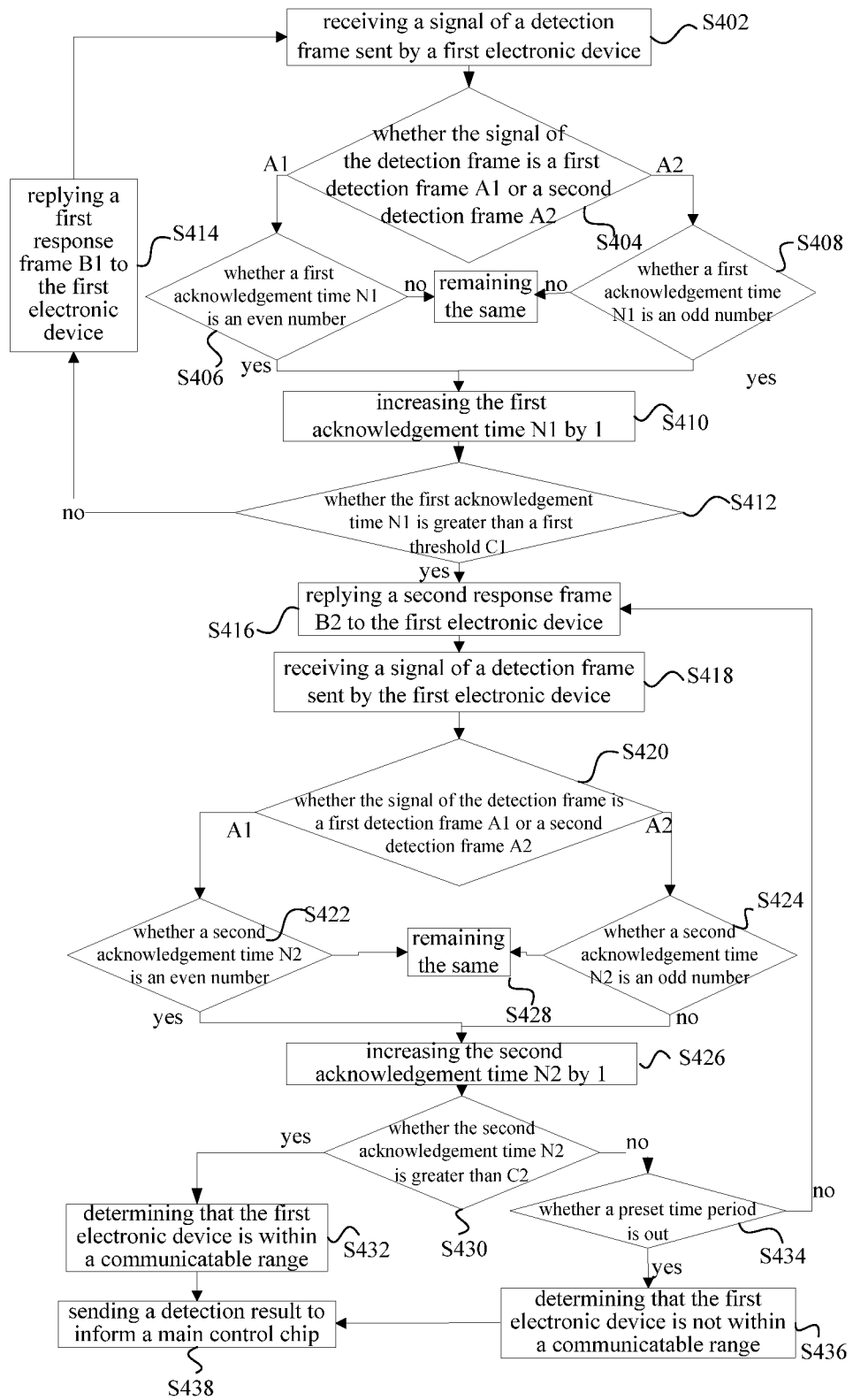
FIG. 9 is a flowchart of a proximity detection method applied to a second electronic device according to a preferred embodiment of the present disclosure.

As shown in FIG. 9, it is a proximity detection method applied to a Slave provided in a preferred embodiment of the present disclosure, and the method includes:

S402, receiving a signal of a detection frame sent by a Master;

S404, determining whether the signal of the detection frame is a first detection frame A1 or a second detection frame A2, if it is A1, performing step S406, and if it is A2, performing step S408;

S406, determining whether a first acknowledgement time N1 is an even number, and if yes, performing step S410, otherwise remaining the same;

S408, determining whether the first acknowledgement time N1 is an odd number, and if yes, performing step S410, otherwise remaining the same;

S410, increasing the first acknowledgement time N1 by 1;

S412, determining whether the first acknowledgement time N1 is greater than a first threshold C1, and if no, performing step S412, otherwise performing step S416;

S414, replying a first response frame B1 to the Master, and returning to step S402;

S416, replying a second response frame B2 to the Master;

S418, receiving a signal of a detection frame sent by the Master;

S420, determining whether the signal of the detection frame is a first detection frame A1 or a second detection frame A2, if it is A1, performing step S422, and if it is A2, performing step S424;

S422, determining whether a second acknowledgement time N2 is an even number, and if yes, performing step S426, otherwise performing step S428;

S424, determining whether a second acknowledgement time N2 is an odd number, and if yes, performing step S426, otherwise performing step S428;

S426, increasing the second acknowledgement time N2 by 1;

S428, keeping the second acknowledgement time N2 the same;

S430, determining whether the second acknowledgement time N2 is greater than C2, and if yes, performing step S432, otherwise performing step S434; where the C2 is a predetermined second threshold.

S432, if it is determined that the Master is within a communicatable range, performing step S438;

S434, determining whether a preset time period is out, if no, returning to step S416, otherwise performing step S436;

S436, determining that the Master is not within a communicatable range;

S438, sending a detection result to a main control chip.

Embodiment 4

Figure 10:
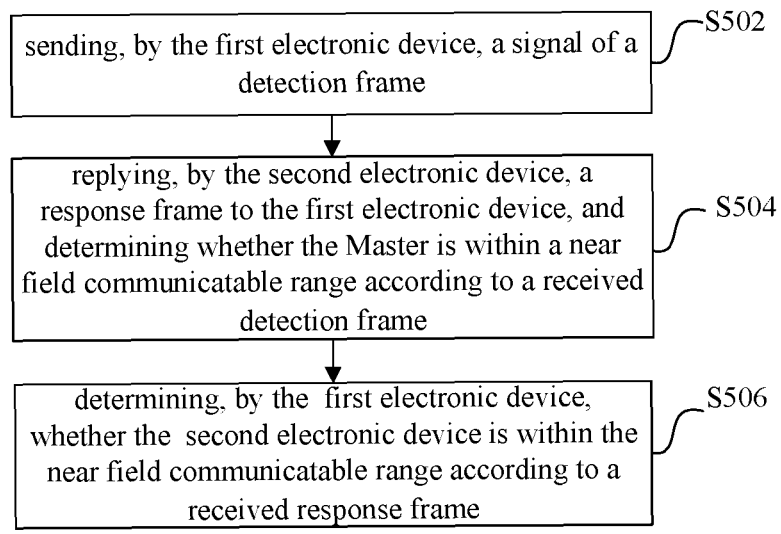
FIG. 10 is a flowchart of a proximity detection method according to an embodiment of the present disclosure.

As shown in FIG. 10, it is a flowchart of a proximity detection method provided in an embodiment of the present disclosure, and the method is applied to a Master and a Slave for a near field communication, including:

S502, sending, by the Master, a signal of a detection frame;

S504, replying, by the Slave, a response frame to the Master, and determining whether the Master is within a near field communicatable range according to a received detection frame;

S506, determining whether the Slave is within the near field communicatable range according to a received response frame.

Both the detection frame and the response frame include at least two symbols modulated with different frequencies, and a symbol means a minimum communication unit that carries bit data.

It should be noted that, the above-mentioned technical features of the proximity detection method applied to the Master and the proximity detection method applied to the Slave also apply to this embodiment, which will not be repeated redundantly herein.

Embodiment 5

Figure 11:
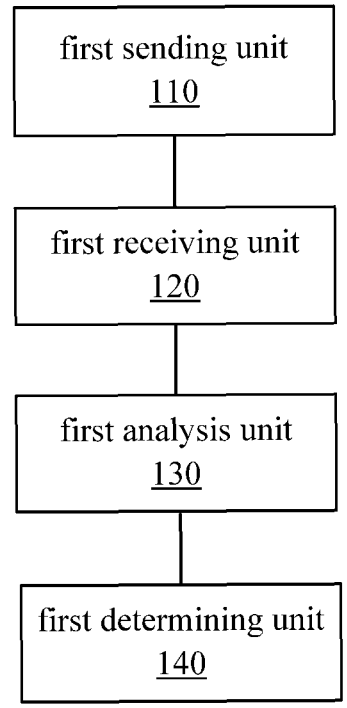
FIG. 11 is a schematic structural diagram of a proximity detection apparatus applied to a first electronic device according to an embodiment of the present disclosure.

As shown in FIG. 11, it is a module structural diagram of a proximity detection apparatus provided in an embodiment of the present disclosure, and the apparatus is applied to a Master for a near field communication, including:

a first sending unit 110, configured to send a signal of a detection frame, where the detection frame includes at least two symbols modulated with different frequencies.

As a preferred solution, the first sending unit 110 is specifically configured to: send a first detection frame A1 or a second detection frame A2; when the signal of the response frame replied by a Slave is received, switch the detection frame to be sent from the first detection frame A1 to the second detection frame A2 or from the second detection frame A2 to the first detection frame A1.

A first receiving unit 120 is configured to receive a signal of a response frame replied by the Slave.

A first analysis unit 130 is configured to analyze the received response frame replied by the Slave.

Specifically, the first analysis unit 130 is configured to analyze a type of the response frame, for example, it is a first response frame B1 or a second response frame B2.

A first determining unit 140 is configured to determine whether the Slave is within a near field communicatable range according to the received response frame.

As a preferred solution, the first determining unit 140 is specifically configured to: when the received response frame replied by the Slave is the second response frame B2, increase a second response time M2 by 1, further determine whether M2 meets a second threshold C2, and if yes, determine that the Slave is located within a near field communicatable range.

The above-mentioned technical features of the proximity detection method applied to the Master similarly apply to the detection apparatus in this embodiment correspondingly, which will not be repeated redundantly herein.

Embodiment 6

Figure 12:
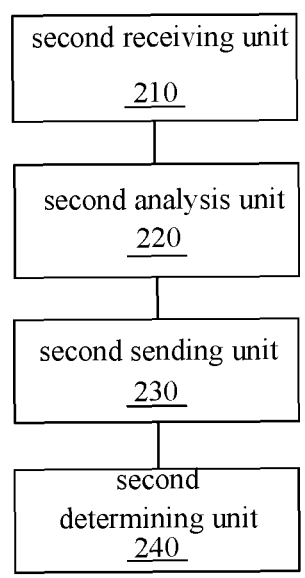
FIG. 12 is a schematic structural diagram of a proximity detection apparatus applied to a second electronic device according to an embodiment of the present disclosure.

As shown in FIG. 12, it is a module structural diagram of a proximity detection apparatus provided in an embodiment of the present disclosure, and the apparatus is applied to a Slave for a near field communication, including:

a second receiving unit 210, configured to receive a signal of a detection frame sent by a Master;

a second analysis unit 220, configured to analyze the signal of the detection frame received by the second receiving unit 210;

a second sending unit 230, configured to send a response frame to the Master, where the response frame includes at least two symbols modulated with different frequencies.

As a preferred solution, the second sending unit 230 is specifically configured to: determine whether the signal of the detection frame is a first detection frame A1 or a second detection frame A2 after receiving the signal of the detection frame, and if the detection frame is the first detection frame A1 and a first acknowledgement time N1 is an even number, increase the first acknowledgement time N1 by 1, otherwise remain the same; if the detection frame is the second detection frame A2 and the first acknowledgement time N1 is an odd number, increase the first acknowledgement time N1 by 1, otherwise remain the same; and determine whether a first acknowledgement time N1 exceeds a first threshold C1, and if the first acknowledgement time N1 exceeds the first threshold C1, send a second response frame B2 to the first electronic device, otherwise, send a first response frame B1 to the first electronic device.

A second determining unit 240 is configured to determine whether the Master is within a near field communicatable range according to the received detection frame.

As a preferred solution, the second determining unit 240 is specifically configured to: when the first acknowledgement time N1 exceeds the first threshold C1, if the signal of the detection frame is received, determine whether the signal of the detection frame is the first detection frame A1 or the second detection frame A2, and if the detection frame is the first detection frame A1 and a second acknowledgement time N2 is an even number, increase the second acknowledgement time N2 by 1, otherwise remain the same; if the detection frame is the second detection frame A2 and the second acknowledgement time N2 is an odd number, increase the second acknowledgement time N2 by 1, otherwise remain the same; determine whether the second acknowledgement time N2 meets a second threshold C2, and if yes, determine that the first electronic device is located within a near field communicatable range.

It should be noted that, any electronic device performing a near field communication by using an electric field is included within the protection scope of the present disclosure. The electronic device in the embodiments of the present disclosure includes but is not limited to a touch screen terminal (e.g., iPhone, iPad), or a touch terminal with a touch tablet, a key and a slider (e.g., Notebook, iPod or the like). The electronic device in the embodiments of the present disclosure may also connect to other electronic devices through an interface such as a USB, an HDMI, an audio input and output (e.g., a hole of a headset), or the like, to implement a function of a near field communication.

According to the proximity detection method and apparatus for the near field communication in the embodiments of the present disclosure, the first electronic device sends the signal of the detection frame which includes multiple symbols modulated with different frequencies, so that a second electronic device existing within a communicatable range can be detected in a case of that these modulation frequencies suffer an interference. A detection result may be taken as a condition of triggering a communication to enable an electronic device to identify whether the communication is needed. Meanwhile, it may also inform respective main control chip to close a LCD, so that an interference is minimized, thereby improving quality of the communication.

Those of ordinary skill in the art may understand that all or a part of the steps of the methods in the above-mentioned embodiments may be implemented by a program controlling relevant hardware, and the program may be stored in a computer readable storage medium, for example, the storage medium may be a ROM/RAM, a magnetic disk or an optical disk, etc.

The preferred embodiments of the present disclosure are illustrated by referring to the accompanying drawings, but the protection scope of the present disclosure is not limited thereto. Multiple transformation solutions may be made to implement the present disclosure without departing from the scope and essence of the present disclosure by those skilled in the art. For example, a feature of one embodiment may be used for another embodiment to obtain a yet another embodiment. Any modification, equivalent substitution or improvement made within the conception of the present disclosure should be encompassed in the protection scope of the present disclosure.

INDUSTRIAL APPLICABILITY

According to the proximity detection method and apparatus for the near field communication in the embodiments of the present disclosure, the first electronic device sends the signal of the detection frame which includes multiple symbols modulated with different frequencies, so that a second electronic device existing within a communicatable range can be detected in a case of that these modulation frequencies suffer an interference. A detection result may be taken as a condition of triggering a communication to enable an electronic device to identify whether the communication is needed. Meanwhile, it may also inform respective main control chip to close a LCD, so that an interference is minimized, thereby improving quality of the communication.

What is claimed is:

1. A proximity detection method of a near field communication, applied to a first electronic device for the near field communication, wherein the method comprises:
   sending a signal of a detection frame by the first electronic device, wherein the detection frame comprises at least two symbols modulated with different frequencies;
   determining whether a second electronic device capable of performing the near field communication exists according to a received response frame;
   wherein the detection frame comprises a first detection frame A1 and a second detection frame A2, and the sending a signal of a detection frame by the first electronic device further comprises:
   sending the first detection frame A1 or the second detection frame A2;
   when a signal of the response frame replied by the second electronic device is received, switching a detection frame to be sent from the first detection frame A1 to the second detection frame A2 or from the second detection frame A2 to the first detection frame A1.

2. The proximity detection method according to claim 1, wherein the response frame comprises a first response frame B1 and a second response frame B2, and the determining whether the second electronic device capable of performing the near field communication exists according to the received response frame further comprises:
   increasing a first response time M1 by 1 after receiving the response frame replied by the second electronic device;
   if the response frame is the second response frame B2, increasing a second response time M2 by 1, further determining whether M2 meets a second threshold C2, and if yes, determining that the second electronic device is located within a near field communicatable range.

3. The proximity detection method according to claim 2, wherein if the response frame replied by the second electronic device is not received again within a preset time, decreasing the first response time M1 or the second response time M2 by at least 1 time.

4. The proximity detection method according to claim 2, wherein,
the first response frame B1 is: [F6, F5, F4, F3, F2, F1];
the second response frame B2 is: [F4, F5, F6, F1, F2, F3]; or
the first response frame B1 is: [F4, F3, F2, F1];
the second response frame B2 is: [F3, F4, F2, F1];
wherein the F1, F2, F3, F4, F5, F6 are symbols modulated with different frequencies respectively.

5. The proximity detection method according to claim 1, wherein,
the first detection frame A1 is: [F1, F2, F3, F4, F5, F6];
the second detection frame A2 is: [F3, F2, F1, F6, F5, F4]; or
the first detection frame A1 is: [F1, F2, F3, F4];
the second detection frame A2 is: [F2, F1, F4, F3];
wherein the F1, F2, F3, F4, F5, F6 are symbols modulated with different frequencies respectively.

6. The proximity detection method according to claim 5, wherein the F1, F2, F3, F4, F5, F6 respectively represent symbols modulated with 450 KHz, 400 KHz, 350 KHz, 300 KHz, 250 KHz and 200 KHz, or any six neighbor frequencies in a frequency set {525 KHz, 487.5 KHz, 412.5 KHz, 375 KHz, 337.5 KHz, 262.5 KHz, 225 KHz, 187.5 KHz}.

7. A proximity detection method of a near field communication, applied to a second electronic device for the near field communication, wherein the method comprises:
receiving a signal of a detection frame sent by a first electronic device;
replying a response frame to the first electronic device, wherein the response frame comprises at least two symbols modulated with different frequencies; and
determining whether the first electronic device is within a near field communicatable range according to the received detection frame;
wherein the detection frame comprises a first detection frame A1 and a second detection frame A2, and the replying the response frame to the first electronic device further comprises:
determining whether the signal of the detection frame is the first detection frame A1 or the second detection frame A2 after receiving the signal of the detection frame, and if the detection frame is the first detection frame A1 and a first acknowledgement time N1 is an even number, increasing the first acknowledgement time N1 by 1, otherwise remaining the same; if the detection frame is the second detection frame A2 and the first acknowledgement time N1 is an odd number, increasing the first acknowledgement time N1 by 1, otherwise remaining the same;
determining whether the first acknowledgement time N1 exceeds a first threshold C1, and if the first acknowledgement time N1 exceeds the first threshold C1, sending a second response frame B2 to the first electronic device, otherwise, sending a first response frame B1 to the first electronic device.

8. The proximity detection method according to claim 7, wherein the determining whether the first electronic device is within the near field communicatable range according to the received detection frame further comprises:
when the first acknowledgement time N1 exceeds the first threshold C1, if the signal of the detection frame is received, determining whether the signal of the detection frame is the first detection frame A1 or the second detection frame A2, and if the detection frame is the first detection frame A1 and a second acknowledgement time N2 is an even number, increasing the second acknowledgement time N2 by 1, otherwise remaining the same; if the detection frame is the second detection frame A2 and the second acknowledgement time N2 is an odd number, increasing the second acknowledgement time N2 by 1, otherwise remaining the same;
determining whether the second acknowledgement time N2 meets a second threshold C2, and if yes, determining that the first electronic device is located within the near field communicatable range.

9. The proximity detection method according claim 7, wherein the detection frame comprises a first detection frame A1 and a second detection frame A2, and the response frame comprises a first response frame B1 and a second response frame B2, wherein:
the first detection frame A1 is: [F1, F2, F3, F4, F5, F6];
the second detection frame A2 is: [F3, F2, F1, F6, F5, F4];
the first response frame B1 is: [F6, F5, F4, F3, F2, F1];
the second response frame B2 is: [F4, F5, F6, F1, F2, F3]; or
the first detection frame A1 is: [F1, F2, F3, F4];
the second detection frame A2 is: [F2, F1, F4, F3];
the first response frame B1 is: [F4, F3, F2, F1];
the second response frame B2 is: [F3, F4, F2, F1];
wherein the F1, F2, F3, F4, F5, F6 are symbols modulated with different frequencies respectively.

10. The proximity detection method according to claim 9, wherein the F1, F2, F3, F4, F5, F6 respectively represent symbols modulated with 450 KHz, 400 KHz, 350 KHz, 300 KHz, 250 KHz and 200 KHz, or any six neighbor frequencies in a frequency set {525 KHz, 487.5 KHz, 412.5 KHz, 375 KHz, 337.5 KHz, 262.5 KHz, 225 KHz, 187.5 KHz}.

11. A proximity detection method of a near field communication, applied to a first electronic device and a second electronic device for the near field communication, wherein the method comprises:
sending, by the first electronic device, a signal of a detection frame;
replying, by the second electronic device, a response frame to the first electronic device, and determining whether the first electronic device is within a near field communicatable range according to a received detection frame; and
determining, by the first electronic device, whether the second electronic device is within the near field communicatable range according to a received response frame,
wherein both the detection frame and the response frame comprise at least two symbols modulated with different frequencies;
wherein the detection frame comprises a first detection frame A1 and a second detection frame A2, and the sending a signal of a detection frame by the first electronic device further comprises:
sending the first detection frame A1 or the second detection frame A2;
when a signal of the response frame replied by the second electronic device is received, switching a detection frame to be sent from the first detection frame A1 to the second detection frame A2 or from the second detection frame A2 to the first detection frame A1.

12. A proximity detection apparatus for a near field communication, applied to a first electronic device for the near field communication, wherein the apparatus comprises:

a transmitter, configured to send a signal of a detection frame, wherein the detection frame comprises at least two symbols modulated with different frequencies;

a receiver, configured to receive a signal of a response frame replied by a second electronic device; and a processor, configured to analyze the response frame replied by the second electronic device and determine whether the second electronic device is within a near field communicatable range according to the received response frame;

wherein the transmitter is configured to: send a first detection frame A1 or a second detection frame A2; when the signal of the response frame replied by the second electronic device is received, switch the detection frame to be sent from the first detection frame A1 to the second detection frame A2 or from the second detection frame A2 to the first detection frame A1.

13. The proximity detection apparatus according to claim 12, wherein the processor is configured to: when the received response frame replied by the second electronic device is a second response frame B2, increase a second response time M2 by 1, further determine whether M2 meets a second threshold C2, and if yes, determine that the second electronic device is located within the near field communicatable range.

14. A proximity detection apparatus for a near field communication, applied to a second electronic device for the near field communication, wherein the apparatus comprises:

a receiver, configured to receive a signal of a detection frame sent by a first electronic device;

a transmitter, configured to send a response frame to the first electronic device, wherein the response frame comprises at least two symbols modulated with different frequencies; and a processor, configured to analyze the signal of the detection frame and determine whether the first electronic device is within a near field communicatable range according to the received detection frame;

wherein the processor is configured to: determine whether the signal of the detection frame is a first detection frame A1 or a second detection frame A2 after receiving the signal of the detection frame, and if the detection frame is the first detection frame A1 and a first acknowledgement time N1 is an even number, increase the first acknowledgement time N1 by 1, otherwise remain the same; if the detection frame is the second detection frame A2 and the first acknowledgement time N1 is an odd number, increase the first acknowledgement time N1 by 1, otherwise remain the same; and the transmitter is configured to determine whether the first acknowledgement time N1 exceeds a first threshold C1, and if the first acknowledgement time N1 exceeds the first threshold C1, send a second response frame B2 to the first electronic device, otherwise, send a first response frame B1 to the first electronic device.

15. The proximity detection apparatus according to claim 14, wherein the processor is configured to: when the first acknowledgement time N1 exceeds the first threshold C1, if the signal of the detection frame is received, determine whether the signal of the detection frame is the first detection frame A1 or the second detection frame A2, and if the detection frame is the first detection frame A1 and a second acknowledgement time N2 is an even number, increase the second acknowledgement time N2 by 1, otherwise remain the same; if the detection frame is the second detection frame A2 and the second acknowledgement time N2 is an odd number, increase the second acknowledgement time N2 by 1, otherwise remain the same; determine whether the second acknowledgement time N2 meets a second threshold C2, and if yes, determine that the first electronic device is located within the near field communicatable range.

* * * * *